United States Patent [19]

Kuder

[11] Patent Number: 4,878,212
[45] Date of Patent: * Oct. 31, 1989

[54] OPTICAL RECORDING MEDIUM COMPRISING A MICROPOROUS POLYMER RECORDING LAYER

[75] Inventor: James E. Kuder, Fanwood, N.J.

[73] Assignee: Hoechst Celanese Corporation, Somerville, N.J.

[*] Notice: The portion of the term of this patent subsequent to Jan. 13, 2004 has been disclaimed.

[21] Appl. No.: 161,373

[22] Filed: Feb. 22, 1988

Related U.S. Application Data

[63] Continuation of Ser. No. 657,918, Oct. 5, 1984, abandoned.

[51] Int. Cl.$^4$ .................................................. G11B 7/00
[52] U.S. Cl. ...................................... 369/100; 428/64; 430/945
[58] Field of Search ............... 369/100, 275, 284, 288; 346/135.1, 1.1, 76 L; 430/945; 428/500; 264/288.8, 41, 210.8, 290.5

[56] References Cited

U.S. PATENT DOCUMENTS

| | | | |
|---|---|---|---|
| 3,475,760 | 10/1969 | Carlson | 358/344 |
| 3,739,088 | 6/1973 | Landsman | 346/76 L |
| 3,742,853 | 7/1973 | Landsman | 346/76 L |
| 3,801,404 | 4/1974 | Druin et al. | 264/288.8 |
| 3,832,948 | 9/1974 | Barker | 346/76 L X |
| 4,032,691 | 6/1977 | Kido et al. | 346/76 L |
| 4,176,277 | 11/1979 | Bricot et al. | 369/275 X |
| 4,245,229 | 1/1981 | Stephens | 369/275 |
| 4,365,258 | 12/1982 | Geyer et al. | 358/342 |
| 4,380,016 | 4/1983 | Lehureau et al. | 346/135.1 |
| 4,403,231 | 9/1983 | Ando et al. | 346/135.1 |
| 4,422,159 | 12/1983 | Craighead et al. | 369/275 |
| 4,461,807 | 7/1984 | Mori et al. | 346/135.1 |
| 4,478,782 | 10/1984 | Kuder et al. | 428/64 |
| 4,636,804 | 1/1987 | Kuder | 346/135.1 |

OTHER PUBLICATIONS

Bell et al., "High-Performance Te Trilayer for Optical Recording", Appl. Phys. Lett. 34 (4), 2/15/79, pp. 275-276.
Freese et al., "Characteristics of Bubble-Forming Optical Direct-Read-After-Write (DRAW) Media", SPIE, vol. 329, Optical Disk Technology (1982), pp. 174-180.
Craighead et al., "Textured Surfaces: Optical Storage and Other Applications", J. Vac. Sci. Tech., vol. 20, No. 3, 3/1982, pp. 316-319.
Haller et al., IBM Tech. Dis. Bulletin, vol. 22, No. 3, Aug. 1979, p. 1234.
Cuomo et al., IBM Tech. Dis. Bulletin, vol. 25, No. 12, May 1983, pp. 6408-6414.

*Primary Examiner*—Vincent P. Canney
*Assistant Examiner*—Hoa T. Nguyen
*Attorney, Agent, or Firm*—Burns, Doane, Swecker & Mathis

[57] ABSTRACT

Provided is an archival recording medium and a method for recording information on same. The recording medium comprises a microporous polymeric layer and an energy-absorbing material, e.g., a layer of an energy-absorbing material such as a metal or dye/polymer layer deposited on the microporous layer. If desired, further dimensional stability and mechanical strength can be provided by a thermally stable substrate or by tensioning the medium within a rigid frame. Information is recorded by the energy-absorbing material heating up in localized irradiated regions and causing the controlled collapse of the microporous structure in the microporous polymer layer. The collapsed portions of the structure constitute the information which can then be read either by reflectance or transmission.

20 Claims, No Drawings

OPTICAL RECORDING MEDIUM COMPRISING A MICROPOROUS POLYMER RECORDING LAYER

This application is a continuation of application Ser. No. 657,918, filed Oct. 5, 1984, now abandoned.

BACKGROUND OF THE INVENTION

1. Field of the Invention

This invention relates to a novel optical information recording medium and the recording of information thereon. More particularly, the present invention relates to an information recording medium, preferably in the form of a disk, suitable for use with optical recording and playback apparatus, which recording medium comprises a microporous polymeric layer as the information layer. The present invention also relates generally to an optical recording medium used in the form of a tape or as a strip on a card wherein the medium comprises a microporous polymeric layer.

2. Description of the Prior Art

Various optical recording media and methods for recording information thereon are known to the prior art. For example, the recording of information in the form of deformations or ripples in a thermoplastic film is known, with techniques for achieving such deformations involving the steps of (1) forming a charge pattern on the surface of the thermoplastic film in accordance with the information to be recorded, (2) heating the thermoplastic film to its melting point so as to permit the electrostatic forces produced by the charges to form a deformation pattern in the thermoplastic film corresponding to the charge pattern and thus to the information to be recorded, and (3) then cooling the thermoplastic film below its melting point to fix the thus formed deformation pattern in the film. Reading of the plastic film may be accomplished using well known optical techniques. See, e.g., U.S. Pat. No. 3,952,146.

Optical recording methods in which light from a laser or other suitable light source is focused upon the surface of a recording medium with sufficient intensity to cause the formation of pits in the surface material have also been proposed. In such methods, an information representative pattern of pits is formed in the surface of the recording medium by suitable controlling the intensity of the focused light in accordance with the information to be recorded while relative motion is established between the recording medium and the focused light soot.

For instance, in recent years, attention has been increasingly paid to the information recording method in which information is written in a thin film of metal or the like formed on a substrate by using a laser ray or beam. According to such a method, the recording of information has been accomplished by forming holes or recesses in the metallic thin film under the action of a thermal energy beam such as a laser ray. See, e.g., U.S. Pat. No. 4,238,803.

Spong, U.S. Pat. No. 4,097,895, describes a recording medium which comprises a light reflecting material, such as aluminum or gold, coated with a light absorbing layer, such as fluorescein, which is operative with an argon laser light source. The thickness of the light absorbing layer is chosen so that the structure has minimum reflectivity. An incident light beam then ablates, vaporizes or melts the light absorbing layer, leaving a hole and exposing the light reflecting layer. After recording at the wavelength of the recording light, maximum contrast between the minimum reflectance of the light absorbing layer and the reflectance of the light reflecting layer exists. In this regard, note also U.S. Pat. No. 4,219,826.

Carlson, in U.S. Pat. No. 3,475,760, discloses a system for directly recording information in a thermoplastic film as a deformation by using a high energy laser scanning beam of small diameter.

It has also recently been proposed to employ in an optical disk a thermodegradable layer upon which is deposited a metallic layer which is absorbent at the wavelenqth of the inscription radiation. See, for example, U.S. Pat. No. 4,380,016. Upon radiation, the deposited metallic layer heats up, with the heat being diffused towards the thermodegradable layer. The thermodegradable layer thereby is heated to its degradation temperature and the areas thereof in contact with the heated metal zones are destroyed to provide an information bit.

In U.S. Pat. No. 4,032,691, there is disclosed an optical disk comprised of a recording layer of a metal, dye and/or synthetic resin, and a thermally insulating base layer. To increase the sensitivity of the recording material, the patent proposes to use a porous layer between the support and the recording layer.

The use of bubbles, or vesicular materials, in optical disks has also been suggested. For example, in an article by R. P. Freese et al entitled "Characteristics of Bubble-Forming Optical Direct-Read-After-Write (DRAW) Media", *SPIE*, Vol. 329 Optical Disk Technology (1982), there is described a trilayer thin film construction useful in optical disks. The top layer consists of a thin, tough film of a refractory material. The middle layer is an optical spacer of either organic or inorganic material. The bottom layer is a reflective metallic film, such as Cr, Al, Ti or Cu. When the media is exposed to a well focused laser beam, a protuberance or bubble is formed. This formation of the surface protuberance destroys the anti-reflectance condition of the trilayer stack, thus enabling a high reflectance contrast readout of the information.

In "Textured Surfaces: Optical Storage and Other Applications", by Craighead et al, *J. Vac. Sci. Technol.*, Vol. 20 (3), March 1982, there is also disclosed the use of textured surfaces and the selective melting thereof to form smooth reflective regions which can be read as recorded information.

Despite all of the foregoing techniques for the optical recording of information on media such as disks, cards or tapes, the search for a low cost, low energy approach (i.e., more energy efficient approach), particularly as compared to ablative hole burning in metallic layers or dye/polymer layers, is continually on-going.

Accordingly, it is a major objective of the present invention to provide a novel optical recording medium which is stable and on which information can be readily and effectively recorded with a low expenditure of energy.

It is yet another object of the present invention to provide a novel recording medium upon which information is recorded as a transparent region.

It is still another object of the present invention to provide a recording medium which comprises a microporous polymeric layer whose structure will selectively and controllably be collapsed to provide a recordation of information.

It is still another object of the present invention to provide a recording disk, card or tape comprising a uniquely suited polymer layer which renders the recording of information technically accurate, economically expedient and energy efficient.

Yet another object of the subject invention is to provide a novel method of recording information by using a microporous polymer layer as an information layer.

These and other objects, as well as the scope, nature and utilization of the invention, will be apparent to those skilled in the art from the following description and the appended claims.

SUMMARY OF THE INVENTION

In accordance with the foregoing objectives, provided herewith is such a novel information recording medium. The recording medium comprises:

(i) an opaque microporous polymer layer, and (ii) an energy-absorbing material physically contacting the microporous polymer layer.

The microporous polymer layer is comprised of a polymer such as polypropylene or polyethylene having an open-celled structure, preferably with an effective pore size of less than 500 Angstroms. The energy-absorbing material may be any suitable material, such as a dye, incorporated into the microporous polymer layer, or a light absorbing layer deposited thereon. The light absorbing layer deposited on the microporous layer may comprise, for example, a metal or dye/polymer layer.

It has been found that upon irradiation of the foregoing system, the energy-absorbing material heats up in the irradiated regions to thereby cause structural collapse in a well-defined (i.e., the heated) area of the microporous layer. Upon collapse of the structure, the result is a transparent area in the polymer layer vis-a-vis the opacity of the remaining polymer layer. The transparent regions thereby define the recorded information.

It is preferred to employ a substrate for the purpose of additional mechanical strength. Any conventional substrate may be employed. Of course, for certain applications it may be desirable for the recording medium to remain flexible. The use of a dye material incorporated into the microporous polymer is a preferred embodiment in such an instance.

DETAILED DESCRIPTION OF THE INVENTION

The present invention provides a recording medium comprising a microporous polymer. The use of a microporous polymer is central to the present invention since it is the use thereof which results in the advantages of the present invention.

The microporous polymer which comprises the information layer of the recording medium is initially opaque due to its porous structure providing so many "nuclei" to cause light scattering. Upon collapse of the structure in a particular area, however, that particular region becomes transparent due to the lack of "nuclei", and denotes an information bit. Moreover, the energy invested in causing this selective collapse of the microporous structure is much less than that required to ablate a polymer or metallic layer to cause a pit therein. Due to the porosity of the polymer layer, very little polymer need be melted to cause a total collapse of the structure in a well-defined area. As well, due to the stretch tension which generally exists in a film of microporous polymer when a stretching technique is employed in its manufacture, less heat is required to thereby cause a collapse of the polymer. If the film structure is established by a stretching technique, as the material softens, the inherent strain is released resulting in the material pulling away from the heated spot. This results in also removing reflective or energy-absorbing material from the heated soot. This is the reason that Celgard ® and other microporous films made by a stretch technique are preferred to the use of microporous films manufactured by a non-stretch technique, e.g., leaching. The sensitivity of the layer is simply greater.

It has furthermore been found that such collapse of the porous structure to give a light transparent region provides a significant contrast with the remaining opaque polymer layer so as to be suitable for use in optical disks, as well as other forms of media such as cards and tape. Thus, a highly sensitive and energy efficient system is achieved through the use of a microporous information layer in accordance with the present invention.

A significant group of polymers, i.e., synthetic resinous materials, from which the microporous polymer may be formed are the olefin polymers, e.g., polyethylene, polypropylene, poly-3-methyl butene-1, poly-4-methyl pentene-1, 4-methyl pentene-1, or copolymers thereof with each other or with minor amounts of other olefins, e.g., copolymers of propylene and ethylene, copolymers of a major amount of 3-methyl butene-1 and a minor amount of a straight chain n-alkene such as n-octene-1, n-hexadecene-1, relatively long chain alkenes, as well as copolymers of 3-methyl pentene-1 and any of the same n-alkenes mentioned previously in connection with 3-methyl butene-1.

The invention also contemplates the use of high molecular weight acetal, e.g., oxymethylene polymers. While both acetal homopolymers and copolymers are contemplated, the preferred acetal polymer is a "random" oxymethylene copolymer, i.e., one which contains recurring oxymethylene, i.e., $-CH_2-O-$, units interspersed with $-OR-$ groups in the main polymer chain where R is a divalent radical containing at least two carbon atoms directly linked to each other and positioned in the chain between two valences, with any substituents on said R radical being inert, that is, which do not include interfering functional groups and which will not induce undesirable reactions, and wherein a major amount of the $-OR-$ units exist as single units attached to oxymethylene groups on each side. Examples of preferred polymers include copolymers of trioxane and cyclic ethers containing at least two adjacent carbon atoms such as the copolymers disclosed in U.S. Pat. No. 3,027,352 of Walling et al. These polymers in film form may also have a crystallinity of at least 20 percent, preferably at least 30 percent, and most preferably at least 50 percent, e.g., 50 to 60 percent, or higher. Further, these polymers have a melting point of at least 150° C and a number average molecular weight of at least 10,000. For a more detailed discussion of acetal and oxymethylene polymers, see, *Formaldehyde*, Walker, pp. 175-191, (Reinhold, 1964).

Other relatively crystalline polymers to which the invention may be applied are the polyalkylene sulfides such as polymethylene sulfide and polyethylene sulfide, the polyarylene oxides such as polyhexamethylene adipamide (nylon 66) and polycaprolactam (nylon 6), and polyesters such as polyethylene terephthalate, all of which are well known in the art and need not be described further herein for sake of brevity.

The microporous polymers can be prepared in accordance with any of the well-known methods. It is preferred, however, that a microporous film be employed which was prepared by a stretching technique. For example, the microporous polymer layer can be obtained by using the cold stretching, hot stretching and heat setting process of U.S. Pat. No. 3,801,404, the disclosure of which is herein expressly incorporated by reference. Moreover, the process of U.S. Pat. No. 4,138,459 may also be employed, which disclosure is also expressly incorporated herein by reference. The process comprises uniaxially cold stretching a non-porous elastic polymer fiber at a temperature in the range of between about −20° C and a temperature 25° C below the crystalline melting temperature of the polymer film. The cold stretching is followed by hot stretching in the same direction at a temperature in the range of between about 25° C below the crystalline melting temperature of the polymer film and 5° C below the crystalline melting temperature of the polymer film. The last step is a heat relaxing step which comprises exposing the film under tension to a temperature in the range of between about 40° C below the crystalline melting temperature of the polymer film and 5° C below the crystalline melting temperature of the polymer film, such that the maximum dimension in the direction of stretch of the cold and hot stretched microporous film is reduced.

Other processes which may be used are disclosed in U.S. Pat. Nos. 3,426,754; 3,558,764; 3,843,761 and 3,920,785, the disclosures of which are hereby expressly incorporated by reference.

The microporous polymer layer is characterized by its open-celled structure. Basically, the passageways of the open-celled structure are measured in their short and long direction. The short dimension, i.e., equivalent to the effective pore size, is preferably less than 500 Angstroms, while the long dimension is preferably less than 5000 Angstroms.

It is also quite important that the polymer be microporous, i.e., an open-celled porous structure, preferably with an effective pore size of less than 500 Angstroms. The micro-size of the pores is an important consideration in terms of obtaining good resolution. Larger pores would simply create voids which are too large for good resolution. Moreover, larger pores would allow less control over the ultimate size of the transparent region, also contributing to poor resolution.

In utilizing the microporous polymer for a recording medium, in a preferred embodiment, a microporous polymer film is tensioned within a rigid frame. See, for example, U.S. Pat. No. 4,365,258. Such use is preferred because when the film is stretched, additional stresses, in addition to those previously discussed, are built up in the walls of the microporous structure. When heated, the walls collapse upon relaxation. Therefore, the relative amount of energy needed is less as the energy need only soften the polymer and not melt or degrade same.

The energy or light absorbing layer which is deposited onto the microporous layer comprises a material which is highly absorbent at the wavelength of the recording radiation, said radiation coming from a laser source or other light source which is able to supply a spot of a sufficiently small size for the inscription of microbits of information. Upon radiation, the light absorbing material absorbs the energy and heats up to a sufficient temperature to cause a collapse of the porous structure in the microporous layer in those areas in contact with the heated zones of the light absorbing layer. It is preferred that the energy or light absorbing layer be on the side of the microporous layer facing the light source. The best results have been attained thereby. The light absorbing layer can also, however, be on the bottom side of the microporous layer, e.g., the side not facing the light source.

It is preferred, when utilized, that the light absorbing layer comprise either a metal or a dye/polymer combination. If the layer is metallic, it is preferred that the metal be nickel, aluminum, copper, chromium, or palladium/gold. Such a metallic layer can be deposited on the microporous polymer layer by conventional vacuum evaporation, chemical deposition or sputter coating techniques. The use of a metallic layer is preferred due to its panchromatic absorption, as opposed to a dye which generally absorbs in a narrow band width.

If a polymer/dye layer is used, same can be applied by any suitable coating technique, with a conventional technique such as spin coating, which allows for a high degree of control of film thickness and flatness, being preferred. In order to facilitate the coating procedure it is also generally advantageous that the polymer and dye be soluble in the same organic solvent, such as an alcohol or ketone. In this regard, when a dye is used, the polymer and dye should be compatible and mutually co-soluble, but should not dissolve the microporous polymer.

While the dye is added to the polymer in order to insure absorption of the irradiation, the dye, of course, must be absorptive at the appropriate wavelength. If, for example, the writing is to be achieved with a helium-neon laser of 633 nm, then Oil Blue N dye, *Colour Index* 61555, $\lambda_{max}$ 637 nm, would be a suitable dye for incorporation into the polymer film. If, however, an argon laser is used which provides an output of a wavelength of about 456 nm, an organic dye such as fluorescein, which is highly absorptive at the light frequency of the argon laser, can advantageously be used. Other dyes which may be used include certain nigrosine dyes. The use of a diode laser, generally having output wavelengths in the range of from 780 to 880 nm, would require a suitable dye absorptive in that wavelength region.

The microporous polymer/light absorbing layer system can be employed with a substrate if so desired. Preferably, the system, as well as the substrate, is in the shape of a disk, although other forms, e.g., suitable for use in a tape or card, may also be advantageously used. The substrate is made of a thermally stable material, which is also mechanically rigid and dimensionally stable and which ideally is an isotropic medium and does not warp during storage, writing, erasure or reading.

Depending upon the particular, conventional read mechanism employed, the substrate may be opaque or transparent regarding the read laser beam. The substrate material should be compatible with the polymer employed, with the polymer being capable of adhering well to the substrate either through its own inherent adhesiveness or through the use of a thin layer of an adhesive. Good adhesion, for example, may be defined operationally as the inability to remove the coating from the substrate by means of adhesive tape, e.g., Scotch ® brand tape.

Examples of suitable materials for the substrate include glass and polymethylmethacrylate. Mylar ® is a preferred substrate for use with a tape form, while polyvinyl chloride is a most preferred substrate when the recording medium is utilized in a card.

In an illustrative recording system embodying the principles of the present invention, a record blank of disk form is subject to rotation at a constant linear or constant angular velocity while a beam of light from a light source, e.g., a laser, is focused on the polymer surface of the disk. The intensity of the light beam is controlled in accordance with information to be recorded. Illustratively, the control is effected in accordance with carrier waves modulated in frequency by picture-representative video signals, with the light beam intensity varying as a result between a high level sufficient to cause effective heating of the absorptive material so as to result in a corresponding collapse of the microporous structure, and a low level insufficient to effect such heating/collapse, the frequency of the level alternations varying as the video signal amplitude changes. Preferred writing speeds are in the range of from $10^6$ to $10^7$ bits per second.

The relative diameter of the transparent voids formed in the recording layer will depend not only on the optical and thermal properties of the polymer, but also on the characteristics of the writing beam, i.e., focused spot diameter, depth of focus, intensity profile and intensity and duration of the writing pulse. Optimization of these parameters is familiar to those skilled in the art.

As a result of the controlled collapse in the microporous polymeric material, an information track comprising a succession of transparent voids results, with the voids appearing in those surface regions exposed to the high intensity beam due to the heating of the energy absorbing layer material in response to the high intensity beam exposure. Variations in the length and separation of the transparent voids are representative of the recorded information. Where a continuous sequence of pictures is to be recorded, a spiral information track may be formed by providing relative motion, in a radial direction and at a constant rate during the recording, between the recording beam and the rotating disk. Alternatively, in the absence of such spiral relative motion during the recording, a circular information track may be formed appropriate for "slide" or freeze frame recording purpose.

The result of the above-described recording process is the formation of an information record of a form which facilitates recovery of the recorded information by optical playback processes. The information track of such an information record comprises (1) undisturbed opaque surface regions alternating with (2) transparent regions formed by the recording process, due to complete, or at least partial, collapse of the microporous polymer layer. This information track can be, for example, in either analog or digital form.

While a recording medium in disk form has been used for illustration, the application of the recording medium to tapes and cards can be easily realized following the same principles outlined above. The recordation of the information would simply be achieved in a linear fashion, not a rotational fashion as described above.

In playback or read operations pursuant to the principles of the present invention, a light beam is focused upon the information track, e.g., of a rotating information record of the above-described type. The playback beam has a constant intensity at a level insufficient to effect collapse of the microporous polymer layer. A photodetector, positioned to receive light reflected from the successive regions of the information track as they pass through the path of the focused light, develops a signal representative of the recorded information.

Alternatively, a signal based upon light transmission through the disk can be used to read the information. In the latter mode, if a substrate is used, it is necessary for the substrate to be transparent. The transmission made of reading would be most applicable to a tape or card since the laser and detector are generally stationary.

The following examples are offered in order to further illustrate the subject invention. It should be understood, however, that the examples are merely illustrative and are intended in no manner to be limitative.

EXAMPLE 1

A piece of Celgard ® 2400 microporous polypropylene, sputter coated on one side with nickel to a thickness of 200–300 Angstroms, was placed between pieces of white poster board and irradiated through a 5mm hole using an infrared heat lamp located 4 cm above the sample. The nickel-coated side was away from the lamp. The power density at this position, measured with a Scientech 362 power meter, was 0.68W/cm$^2$. In one second or less, a spot developed in the irradiated area. The spot appeared dark when viewed with front illumination and transparent with back illumination. There was negligible change in the dimensions of the unirradiated areas.

Uncoated Celgard ® 2400 was irradiated in the same manner, and no change occurred in the sample until, after 30 seconds, the poster board mask plus sample became hot, whereupon the sample shrunk to about one third its original length.

The foregoing example demonstrates the feasibility of using localized heating of microporous polymer coated with a suitable absorbing layer to effect a physical change which might be used for optical recording.

Examination by scanning electron microscopy (SEM) of the nickel-coated Celgard ® irradiated as described above showed that the original microporous structure, still present in the masked areas of the film, was absent in the irradiated area.

Relating the above experiment to a recording medium, the signal contrast was measured as follows:

Light emerging from a HeNe laser was passed through a beam splitter, and that portion which emerged straight through was focused by means of a 20×(Numerical aperature [NA] 0.54) microscope objective onto the surface of the sample. The sample itself was taped to a microscope slide and this, in turn, mounted on a YZ stage. The beam reflected from the surface of the sample passed back through the focusing lens and was directed by the beam splitter to a Photamp light transducer. The intensity of the reflected light is proportional to the voltage registered on a multimeter connected to the detector.

Signal contrast, as defined by A. E. Bell and R. A. Bartolini, Appl. Phys. Lett., 34, 275 (1979), is the ratio $(R_f - R_i)/(R_f + R_i)$ where $R_i$ is the initial reflected intensity (i.e., in the unrecorded area) and $R_f$ is the final intensity (in the recorded area). The signal contrast measured on the irradiated sample was −0.83. The negative sign indicates that the film was less reflective (more transmissive) after irradiation than before. If the detector was located not on the same side of the sample as the laser (as described above), but on the opposite side, then the signal could be read by the increase in transmitted intensity in the irradiated area over that in the unirradiated area.

EXAMPLE 2

Marking with a laser rather than a lamp was accomplished as follows. A piece of Ni-coated Celgard ® as in Example 1 was fastened nickel side down, with Scotch tape to a microscope slide, taking care to get the sample as flat as possible. The slide was now attached (Celgard ® side facing laser) to the Yz mount of the optical train described in Example 1.

With the beam splitter in place and a neutral density filter (10% transmission) between the beam splitter and focusing objective (in order to reduce the power below the threshold for marking), the distance between lens and sample was adjusted by means of a focusing collar on the lens. The beam was considered to be focused when the intensity of the reflected light as measured by a Photamp detector at the side of the beam splitter was greatest.

The beam splitter and neutral density filter were then removed, and rows of three spots were irradiated for periods of 5 minutes, 3 minutes, 1 minute , and 30 seconds using the HeNe laser of Example 1. The sample was now examined by optical microscopy. With top illumination, no marks were seen in the row with 30 second irradiation, one each (dark on light background) in the 1 minute and 3 minute rows, and two marks in the 5 minute row. With bottom illumination, the above marks were seen as light, oblong marks on a dark background. These ranged in size from $88 \times 120$ $\mu$m for the 1 minute spot to $142 \times 178$ $\mu$m for the larger of the 5 minute irradiated spots. In addition, the irradiated points which did not give marks visible by top illumination were visible by bottom illumination as partially transparent spots containing an irregular pattern of short dark strands. The two kinds of marks visible with bottom light are interpreted as being due to the two stages which the marking process goes through, namely, partial collapse of the microporous structure followed by complete melting of the porous polymers.

EXAMPLE 3

Marking was done on a Celgard ® 2400 sample vacuum coated with about 500 Angstroms of aluminum. The sample was irradiated using the same set-up as described in Example 2 for periods of 5 seconds to 5 minutes, with the polymer side facing the laser. Upon examination by optical microscopy with bottom light, marks were observed at all irradiation times. In contrast to the oval-shaped holes observed with Ni/Celgard ®, the Al/Celgard ® produced irregularly shaped marks as if the aluminum coating were being torn as the stretched microporous film softened and shrank. The short and long dimensions of the two typical marks were $6 \times 38$ $\mu$m and $27 \times 39$ $\mu$m. There was no trend in spot dimensions with irradiation time.

EXAMPLE 4

A piece of Celgard ® 2400 was coated with a dye/polymer film as follows. A solution of Emerez 1540 (5g) was dissolved in 25 ml of 2-propanol with warming, then Oil Blue N (lg) was added and, after dissolution, the dope was coated on a piece of Celgard ® 2400 using a coating blade set at a height of 20 mils. The coated film was protected from dust and let dry overnight.

The sample was mounted with the uncoated side facing the laser and irradiated for various lengths of time with the HeNe laser set up of Example 2. The shortest time for which marking was observed was one second. Under observation by optical microscopy, the marks appeared to consist of an inner transparent area within a larger elliptical partially transparent area. On a typical spot, the short and long dimensions of the inner spot were $41 \times 46$ $\mu$m, of the outer spot, $89 \times 99 \mu$m. There was no clear trend in spot size with irradiation time. With longer irradiation times, the spots were surrounded by a dye-depleted halo, with the microporous polymer beneath this halo unchanged.

EXAMPLE 5

When a sample of Ni/Celgard ® was irradiated with the nickel side facing the laser using the set-up of Example 2, marking occurred with 30 second irradiation. Optical microscopy indicated that the spots were due to collapse of the opaque microporous polymer to a transparent melt without ablating the thin nickel film. Dimensions of a typical spot in this run were $17 \times 21$ $\mu$m, i.e., smaller than that obtained with experiments in which the metal was behind the Celgard ® during irradiation.

EXAMPLE 6

A sample of aluminum coated Celgard ® was irradiated with the metal side facing the laser. Marking occurred at 60 seconds, but not 30 seconds. Although the outlines of the spots were elliptical, irregular features within the spot suggested that the aluminum coating was being torn by shrinking of the stretched microporous film. Spot size decreased with decreasing exposure. Typical dimensions of a 5 min spot were $20 \times 28$ $\mu$m and, for a 1 minute spot, were $5 \times 28$ $\mu$m.

EXAMPLE 7

Celgard ® 2400 was sputter coated with palladium-gold (PdAu) to a thickness of about 300 Angstroms. When irradiated for periods from 5 minutes to 30 seconds using the set-up of Example 2, marking was observed in all cases as elliptical spots with increased transparency, and some lines suggesting tearing of the metal coating. Typical spot dimensions were $13 \times 28$ $\mu$m, showing little variation with irradiation length.

EXAMPLE 8

A sample of PdAu-coated Celgard ® was irradiated (metal side toward laser) for 1 second intervals using each of three focusing lenses having different numerical apertures. The HeNe laser set-up of Example 2 was used. The long dimension of the spot produced by each lens (average of 3 runs) was: NA 0.25, 60 $\mu$m; NA 0.54, 54 $\mu$m; NA 0.65, 29$\mu$m. The trend is in agreement with the theory that the diffraction limited spot size of a focused beam of laser light is inversely proportional to the numerical aperture of the focusing lens.

EXAMPLE 9

A sample of dye/polymer coated Celgard ® was mounted Celgard ® side toward the laser in the set-up of Example 2, and irradiated for 1 second using the same three lenses as above in Example 8. The average long dimension of the spot produced by each lens was: NA 0.25, 77 $\mu$m; NA 0.54, 69 $\mu$m; NA 0.65, 48 $\mu$m.

EXAMPLE 10

A sample of K-851 high density microporous polyethylene coated with PdAu was mounted with the metal side facing the laser and irradiated (6.3 mW, lens NA 0.54) for lengths of time from 30 seconds to 5 minutes. The marks were well defined, and the variations in spot dimensions among 3 runs at each exposure time were smaller than variations seen in all the preceding examples. When observed by optical microscopy with bottom light, the marks were seen to consist of a central irregularly oblong, transparent area within an elliptically shaped translucent area whose long dimension was perpendicular to the long dimension of the central transparent area. The background was opaque. There was little variation in the dimensions of either inner or outer areas for the range of exposure times used here (i.e., 30 seconds to 5 minutes).

A careful examination of the sample and the marks encoded thereon revealed a relation between the film structure and the appearance of the spots. The microporous structure in both Celgard® and K-851 is produced by stretching partially crystalline polymer films. Thus, in addition to having void spaces (micropores), these films possess a built-in stress which can relax on heating. The result is that as the circular focused laser beam impinges on the surface of the film, the softened polymer relieves the built-in stress by pulling away from the heated area. Further heating results in melting and collapse of the microporous structure. The result is a translucent ellipse whose long dimension is in the machine direction, and a transparent, irregularly shaped central area where the initially continuous metal coating has separated.

EXAMPLE 11

Various samples of microporous polypropylene (PP), having a softening point of about 165° C, and microporous high density polyethylene (HDPE), having a softening point of about 130° C, were sputter coated with PdAu to a thickness of 300 Angstroms. The samples were marked using the step-up of Example 2, except that it included a spatial filter. The aspect ratio and relative sensitivity were compared for each sample and the results tabulated in the following table:

|  | Celgard® 2400 | Celgard® 2500 | K 851 | 6B-1-1 | 10B-1-1 |
| --- | --- | --- | --- | --- | --- |
| Polymer | PP | PP | HDPE | HDPE | HDPE |
| Thickness of polymer layer in mil | 1 | 1 | .65 | .92 | .47 |
| LASER MARKING | | | | | |
| Aspect Ratio (widest dimension/ shortest dimension of pit) | 1.3 | 1.2 | 1.5 | 1.3 | 1.2 |
| Relative Sensitivity | 5 | 4 | 3 | 2 | 1 |

This example demonstrates the feasibility of recording information using optical techniques in a layer of microporous material in accordance with the subject invention.

Samples from a piece of PdAu/K851 used for laser marking were submitted for thermomechanical analysis (TMA) and differential scanning calorimetry (DSC). The TMA showed that a 9.7% decrease in linear dimensions occurs on going from 25° C to about 128° C, at which temperature melting occurs. The onset of shrinkage is at about 62° C. DSC shows the melting endotherm at 132° C, which presumably corresponds to the temperature reached by the sample when laser marking occurs. This may be compared to the melting point of tellurium which is 450° C.

The heat required to raise the temperature of the sample was also obtained by the DSC experiment. This was obtained for two intervals: (i) room temperature to onset of melting (30-125° C), and (ii) room temperature to completion of melting (30-140° C). The two values are: 63.65 cal/g for the range 30-125° C and 105.75 cal/g for the range 30-140° C. Since the sample has a mass of 1.20 mg cm$^2$, the heat required to raise the temperature to 140° C (corresponding to laser marking) is 0.127 cal/cm$^2$ or 0.531 J/cm$^2$. In different units, this is 5.31 nJ/$\mu$m$^2$.

This value may be used to estimate the potential writing speeds attainable employing the present invention. A circular mark with diameter 10$\mu$m has an area $\pi(5\ \mu m)^2 = 78.5\ \mu m^2$/bit. With a 6 mW laser, the corresponding speed is $(6\times10^{-3}W)\ (1\ \text{bit}/78.5\ \mu m^2)/(5.31\times10^{-9}W\text{-sec}/\mu m^2) = 1.4\times10^4$ bits/sec. With a spot having a diameter of 1$\mu$m, the corresponding speed would be $1.4\times10^6$ bits/sec.

Although the invention has been described with preferred embodiments, it is to be understood that variations and modifications may be resorted to as will be apparent to those skilled in the art. Such variations and modifications are to be considered within the purview and the scope of the claims appended hereto.

What is claimed is:

1. An optical recording medium for the recording of information comprising:
    (i) an opaque microporous polymer layer comprised of a microporous polymer film which has been produced by a stretching technique such that the film structure contains an inherent strain, the pores of the microporous polymer film having an effective pore size less than 500 Angstroms, and wherein the microporous polymer layer collapses upon transmission of heat thereto, and
    (ii) an energy-absorbing material situated with regard to the microporous polymer so as to be able to transmit heat thereto, and which upon irradiation with a light source transmits thermal energy to the microporous polymer layer to cause a collapse in the microporous structure of said microporous polymer layer in those areas irradiated.

2. The medium of claim 1, wherein the microporous polymer layer comprises polypropylene or polyethylene.

3. The medium of claim 1, wherein the energy absorbing material comprises a light absorbing layer deposited on one side of said microporous polymer layer.

4. The medium of claim 3, wherein the light absorbing layer is deposited on the side which is to face the light source.

5. The medium of claim 3, wherein the light absorbing layer comprises a metal.

6. The medium of claim 5, wherein the metal is nickel, aluminum, copper, chromium or palladium/gold.

7. The medium of claim 3, wherein the light absorbing layer comprises a polymer/dye system.

8. The optical recording medium of claim 1, wherein the medium is in the form of an optical disk or a tape.

9. The optical recording medium of claim 1, wherein the medium is in the form of a strip utilized on a card.

10. The optical recording medium of claim 1, wherein the medium further comprises a thermally stable substrate.

11. The optical recording medium of claim 1, wherein the medium is tensioned within a rigid frame.

12. The medium of claim 1, wherein the energy absorbing material comprises a dye material incorporated into the microporous polymer.

13. An information medium, useful with playback apparatus employing a playback beam of light of a predetermined frequency, said medium comprising an opaque microporous polymer layer comprised of a microporous polymer film which has been produced by a stretching technique such that the film structure contains an inherent strain, the pores of the microporous polymer film having an effective pore size less than 500 Angstroms, and a light absorbing layer deposited on one side of said microporous polymer layer, with an information track comprising a succession of transparent regions formed in said microporous polymer layer.

14. The medium of claim 13, wherein the microporous layer comprises polypropylene or polyethylene.

15. The medium of claim 13, wherein the light absorbing layer comprises a metal.

16. The medium of claim 15, wherein the metal is nickel, aluminum, copper, chromium or palladium/gold.

17. The medium of claim 13, wherein the light absorbing layer comprises a polymer/dye system.

18. The medium of claim 13, wherein the medium is in the form of a disk or a tape.

19. The medium of claim 12, wherein the medium is in the form of a strip utilized on a card.

20. A method for recording optical information in a polymeric information layer of an optical recording medium comprising the step of irradiating the information layer with a laser beam in accordance with said information to form an information track in the information layer, said information layer comprising an opaque microporous polymer layer comprised of a microporous polymer film which has been produced by a stretching technique such that the film structure contains an inherent strain, the pores of the microporous polymer film having an effective pore size of less than 500 Angstroms, and a light absorbing layer deposited on one side of said microporous polymer layer, which irradiation is sufficient to cause a collapse in the microporous structure of the polymer layer in those areas irradiated to thereby form the information track.

* * * * *